United States Patent [19]
Kondou

[11] Patent Number: 6,045,850
[45] Date of Patent: Apr. 4, 2000

[54] LOW-CALORIE COMPOUNDED COCOA COMPOSITION

[75] Inventor: Tsutomu Kondou, Kanagawa, Japan

[73] Assignee: M & C Sweeteners, LLC, Blair, Nebr.

[21] Appl. No.: 09/074,371

[22] Filed: May 8, 1998

[30] Foreign Application Priority Data

May 8, 1997 [JP] Japan ................................. 9-117975

[51] Int. Cl.⁷ .................................................. A23G 1/00
[52] U.S. Cl. .......................... 426/548; 426/593; 426/631
[58] Field of Search .................................. 426/548, 593, 426/631

[56] References Cited

U.S. PATENT DOCUMENTS

| | | | |
|---|---|---|---|
| 3,627,583 | 12/1971 | Troy | 426/548 |
| 3,876,794 | 4/1975 | Rennhard | 426/548 |
| 3,982,042 | 9/1976 | Arden | 426/593 |
| 4,235,939 | 11/1980 | Kimberly | 426/593 |
| 4,810,516 | 3/1989 | Kong-Chan | 426/548 |
| 4,886,677 | 12/1989 | Kondou | 426/548 |
| 4,902,525 | 2/1990 | Kondou | 426/548 |
| 4,980,189 | 12/1990 | Keme | 426/593 |
| 5,080,916 | 1/1992 | Kondou | 426/548 |
| 5,425,957 | 6/1995 | Gaim-Marsoner | 426/548 |
| 5,468,509 | 11/1995 | Schlup | 426/548 |
| 5,490,996 | 2/1996 | Despland | 426/548 |
| 5,681,606 | 10/1997 | Hutchison | 426/593 |
| 5,753,296 | 5/1998 | Girsh | 426/593 |

FOREIGN PATENT DOCUMENTS

WO94/24883  11/1994  Finland ................... 426/593

*Primary Examiner*—Carolyn Paden
*Attorney, Agent, or Firm*—Oblon, Spivak, McClelland, Maier & Neustadt, P.C.

[57] ABSTRACT

A low-calorie compounded cocoa composition comprising cocoa powder, erythritol, and a sweetener of high sweetness (e.g., Stevia and Aspartame). It is lower in calories than conventional compounded cocoa composition containing sucrose as a sweetener and is pleasant to the taste.

6 Claims, No Drawings

LOW-CALORIE COMPOUNDED COCOA COMPOSITION

FIELD OF THE INVENTION

This invention relates to low-calorie compounded cocoa composition. More particularly, it relates to low-calorie compounded cocoa composition which comprises erythritol, a sweetener of high sweetness and, if desired, maltitol, is lower in calories and pleasant to the taste, and has improved dispersibility and solubility.

BACKGROUND OF THE INVENTION

Commercially available compounded cocoa compositions contain cocoa powder, sucrose as a main sweetener, and other ingredients such as dairy products, emulsifiers, edible salt, flavors, vegetable fats and oils, etc. Compounded cocoa compositions, as dissolved in water, warm water or milk for drinking, are widely preferred for its mild taste and a mellow aroma.

Containing about 10% by weight of sucrose as a sweetener, the conventional compounded cocoa compositions have as high calories as about 53 kcal/100 g, and such a high intake of calories is unfavorable from the standpoint of prevention of obesity and adult diseases. Not confined to compounded cocoa, the use of sucrose has come to be problematical in other beverages. Accordingly, many sucrose-free foods featuring low calories have been developed in the beverage field and come on the market.

However, foods containing sweeteners having a high degree of sweetness, for example, those containing Aspartame or Stevia as a main sweetener are unpleasant to the taste in that the sweet aftertaste remains for some time.

Processes for producing sweeteners such as erythritol and maltitol have recently been developed. The products have now been sold as characteristic sweeteners featuring low calories or non-caries causing properties, and attempts to use them as a food additive have been made. Erythritol is a tetrose alcohol which is soluble in water, and crystallizes very easily into attractive white crystals, and has sweetness corresponding to 75 to 85% of that of sucrose while giving a fresh cool feeling in the mouth. It occurs naturally, too. Erythritol is characterized by being zero in calories. However, erythritol, when used as a main sweetener, leaves an astringent aftertaste in the mouth. Since erythritol is industrially produced from glucose through yeast fermentation, it is 4 to 5 times as costly as sucrose. Therefore, use of erythritol as a chief sweetener increases the cost of the product to an impractical extent. On the other hand, it is impractical to use maltitol as a main sweetener because maltitol tends to cause diarrhea, if taken in a certain amount (20 to 30 g) or more.

SUMMARY OF THE INVENTION

The inventors of the present invention have studied on compounded cocoa composition excellent in both taste and calories and, as a result, found that a combined use of erythritol and a sweetener of high sweetness provides a tasty and low-calorie compounded cocoa composition. The present invention was accomplished based on this finding.

The present invention provides a low-calorie compounded cocoa composition comprising cocoa powder, erythritol, and a sweetener of high sweetness; the low-calorie compounded cocoa composition comprising 6 to 34% by weight of cocoa powder, 24 to 75% by weight of erythritol, and 0.03 to 0.28% by weight of a sweetener of high sweetness; the low-calorie compounded cocoa composition, wherein the erythritol is crystals having passed through a sieve having an opening of 149 $\mu$m; the low-calorie compounded cocoa composition, wherein the sweetener of high sweetness is Stevia and/or Aspartame; and the low-calorie compounded cocoa composition which further comprises 19 to 37% by weight of maltitol.

The low-calorie compounded cocoa composition according to the present invention has pleasant sweetness, is less causative of dental caries and quarter to half as low in calories as conventional compounded cocoa composition containing sucrose as a sweetener. In addition, the low-calorie compounded cocoa composition of the present invention has improved dispersibility and solubility.

DETAILED DESCRIPTION OF THE INVENTION

The low-calorie compounded cocoa composition of the invention contains cocoa powder, erythritol, and a sweetener of high sweetness. The term "compounded cocoa composition" as used herein means a powdered preparation compounded from cocoa powder, sweeteners, dairy products, emulsifiers, edible salt, flavors, vegetable fats and oils, etc., which is ready for drinking on being dissolved in water, warm water, milk, etc. The term "low-calorie compounded cocoa composition" is used herein to denote a compounded cocoa composition whose calories are not more than half of those of compounded cocoa composition containing sugar (sucrose).

While the erythritol content of the low-calorie compounded cocoa composition is not particularly limited as long as is consistent with low calories, a pleasant taste, and improved dispersibility and solubility of cocoa, it preferably ranges from 24 to 75% by weight based on the total weight of the low-calorie compounded cocoa composition.

Erythritol is less soluble than sucrose and becomes slow in dissolving as the crystal size increases. The relationship between the size of erythritol particles and the rate of dissolution of 20 parts by weight of the erythritol particles in 80 parts by weight of water at 80° C. is shown in Table 1 below. The particles having a diameter of 149 $\mu$m or smaller used here were prepared by grinding and drying erythritol crystals available from Mitsubishi-Kagaku Foods Corporation. under the following conditions, and classifying through a JIS standard 149 $\mu$m sieve.

Grinding and Drying Conditions

Grinding machine: Model M-4 grinder manufactured by Nara Kikai K.K.; number of revolution: 3550 rpm; screen: 0.25 mm; throughput capacity: 10 kg/2 min Drying temperature: 72° C.

Powder feed: 30 kg/hr; through an electromagnetic feeder.

Erythritol particles having greater diameters were prepared by classifying the same commercially available erythritol with JIS standard sieves having the respective openings. The particles were put into warm water and stirred gently, and the time required for all the particles to dissolve was taken as a rate of dissolution.

TABLE 1

| Particle Size | Rate of Dissolution |
| --- | --- |
| under 840 $\mu$m sieve and over 710 $\mu$m sieve | 2'18" |
| under 710 $\mu$m sieve and over 500 $\mu$m sieve | 2'00" |

TABLE 1-continued

| Particle Size | Rate of Dissolution |
|---|---|
| under 500 μm sieve and over 250 μm sieve | 1'20" |
| under 149 μm sieve and over 53 μm sieve | 50" |

Since the compounded cocoa composition is generally dispersed and dissolved in warm water for drinking, it is preferred for the erythritol used in the present invention to have a particle size of 149 μm or smaller.

Further, the same dissolution test was carried out by dissolving cocoa powder (comparison) or a mixture of erythritol crystals having a particle size of 74 μm or smaller and cocoa powder in water at 20° C. or 65° C. The results obtained are shown in Table 2. It is seen that cocoa powder combined with erythritol has improved dispersibility and solubility without forming lumps in water.

TABLE 2

| Cocoa powder (part by wt.) | 100 | 95 | 90 |
|---|---|---|---|
| Erythritol (part by wt.) | 0 | 5 | 10 |
| Weight of Sample (g) | 1 | 1.05 | 1.1 |
| Rate of Dissolution | | | |
| 20° C. | 2'30" | 1'40" | 1' |
| 65° C. | 60' | 40' | 30' |

The sweeteners of high sweetness which can be used in combination with erythritol include Aspartame, Stevia, saccharin, saccharin Na, glycyrrhizin, and Acesulfame K, with Stevia and Aspartame being preferred. Stevia includes stevioside, Rebaudioside A, and α-glycosylstevioside. In order to further reduce the calories and improve the sweet taste of the low-calorie compounded cocoa composition while minimizing a heavy aftertaste, these sweeteners of high sweetness are preferably used in an amount of 0.03 to 0.28% by weight based on the total weight of the low-calorie compounded cocoa composition.

The low-calorie compounded cocoa composition can contain maltitol in addition to the above-described sweeteners. In order to make the sweetness richer while suppressing the calories, maltitol is preferably used in an amount of 19 to 37% by weight based on the total weight of the low-calorie compounded cocoa composition. In this case, maltitol comprises the major proportion of the total calories of the sweeteners used so that the calories can be controlled by reducing the maltitol content.

Although maltitol may be seen as a low-calorie sweetener, being satisfactory in sweet flavor, 85% as sweet as sucrose and yet half as low in calories as sucrose, a high maltitol intake can cause diarrhea. Accordingly, it is desirable for the maltitol content in a cocoa beverage not to exceed 20 g per can (corresponding to 350 g).

As far as the low-calorie character is not ruined, the low-calorie compounded cocoa composition of the present invention can further contain other sugar alcohols (e.g., sorbitol and lactitol), reduction degraded products of starch (dextrin reduction products and oligosaccharide reduction products), saccharides (e.g., glucose, thick malt syrup, isomerized sugar), as well as coupling sugar, paratinose, etc., which are conventionally used for foods.

Cocoa powder itself has calories so that the amount to be used is of necessity limited. The substance of the flavor of cocoa beverages is decided by the cocoa content. A preferred cocoa content in the low-calorie compounded cocoa composition ranges from 6 to 34% by weight based on the total weight of the low-calorie compounded cocoa composition. If it is 5% by weight or less, the beverage will have poor body and taste watery. If it is 35% by weight or more, the cocoa beverage tastes bitter and heavy and is high in calories.

In addition to the sweeteners, the low-calorie compounded cocoa composition of the present invention can contain other ingredients generally used in compounded cocoa composition, such as flavors, powdered whole milk, colorants, vegetable or animal fats and oils, and the like. Conditioners, such as sodium citrate, can also be added.

Cocoa powder, erythritol, and other ingredients are compounded together by any methods customarily employed in powder mixing, for example, by means of a twin-cylinder mixer, a horizontal cylinder mixer, a vertical screw mixer, a conical blender, etc.

The present invention will now be illustrated in greater detail by reference to Examples, but it should be understood that the present invention is not limited thereto.

The degree of sweetness and energy of the sweeteners used in Examples and Comparative Example were calculated based on the data shown in Table 3. The data of degree of sweetness were cited from the brochures available from manufacturers. The calories were cited from the data furnished at the sectional meeting on improvement of health and nutrition, Public Health Council, Food Sanitation Division, Environmental Health Bureau, Ministry of Health and Welfare, Japan, held on Mar. 4, 1996.

TABLE 3

| Sweetener | Degree of Sweetness | Calories (kcal/100 g) |
|---|---|---|
| sucrose | 1 | 400 |
| maltitol | 0.85 | 200 |
| erythritol | 0.75 | 0 |
| Aspartame | 200 | 0 |
| Stevia | 200 | 0 |

In evaluation of aftertaste, samples which left no sweet aftertaste were judged "good", and those which left a sweet aftertaste "bad".

The materials used in Examples and Comparative Example were as follows.

Sucrose
  Granular sugar manufactured by Mitsui Sugar Co., Ltd.
Stevia
  Rebaudio A9-90CT produced by Uda Kagaku K.K.
Aspartame
  Product of Ajinomoto Co., Ltd.
Maltitol
  Product of Tokyo Kasei K.K., 98% pure, reagent grade.
Skimmed milk powder
  Product of Snow Brand Milk Products Co., Ltd.
Cocoa powder
  Product of Daito Cacao K.K.
Erythritol
  Erythritol having a particle size of 149 μm or smaller, which was prepared in the same manner as described above.

Compounded cocoa composition was prepared by dry blending the ingredients according to the composition (wt %) shown in Tables below. The resulting compounded cocoa composition was added to water at room temperature to become 100 g and dissolved therein by stirring. The resulting cocoa composition was evaluated in calories and aftertaste. The sweetness of cocoa samples prepared in Examples and Comparative Example was made equal based on calculations from the data of Table 3. Any synergistic effect which might have been produced by mixing of sweeteners was not taken into account. The calories of other ingredients than the sweeteners were not calculated in.

EXAMPLES 1 TO 3 AND COMPARATIVE EXAMPLE 1

TABLE 4

Composition of Compounded Cocoa composition (wt %)

| Ingredient | Comparative Example 1 | Example 1 | Example 2 | Example 3 |
|---|---|---|---|---|
| Sucrose | 71.32 | — | — | — |
| Erythritol | — | 74.91 | 71.28 | 63.4 |
| Stevia | — | 0.03 | 0.07 | 0.21 |
| Skimmed milk powder | 14.27 | 12.48 | 14.25 | 18.11 |
| Cocoa powder | 14.27 | 12.48 | 14.25 | 18.11 |
| Salt | 0.14 | 0.12 | 0.14 | 0.18 |

TABLE 5

Composition of Aqueous Solution (wt %) and Results of Evaluation

| Ingredient | Comparative Example 1 | Example 1 | Example 2 | Example 3 |
|---|---|---|---|---|
| Sucrose | 10 | — | — | — |
| Erythritol | — | 12 | 10 | 7 |
| Stevia | — | 0.005 | 0.01 | 0.0237 |
| Skimmed milk powder | 2 | 2 | 2 | 2 |
| Cocoa powder | 2 | 2 | 2 | 2 |
| Salt | 0.02 | 0.02 | 0.02 | 0.0 |
| Water | 85.98 | 83.98 | 85.97 | 88.9 |
| Results of Evaluation | | | | |
| Calories (kcal/100 g) | 53.1 | 3.1 | 13.1 | 13.1 |
| Aftertaste | good | good | good | good |

EXAMPLES 4 TO 7

TABLE 6

Composition of Compounded Cocoa composition (wt %)

| Ingredient | 4 | 5 | 6 | 7 |
|---|---|---|---|---|
| Erythritol | 29.85 | 27.17 | 39.14 | 52.19 |
| Maltitol | 29.85 | 36.23 | 34.57 | 21.53 |
| Stevia | 0.26 | 0.20 | — | — |
| Aspartame | — | — | 0.03 | 0.04 |
| Skimmed milk powder | 19.90 | 18.11 | 13.05 | 13.05 |
| Cocoa powder | 19.90 | 18.11 | 13.05 | 13.05 |
| Salt | 0.20 | 0.18 | 0.13 | 0.13 |

TABLE 7

Composition of Aqueous Solution (wt %) and Results of Evaluation

| Ingredient | 4 | 5 | 6 | 7 |
|---|---|---|---|---|
| Erythritol | 3 | 3 | 6 | 8 |
| Maltitol | 3 | 4 | 5.3 | 3.3 |
| Stevia | 0.026 | 0.022 | — | — |
| Aspartame | — | — | 0.005 | 0.006 |
| Skimmed milk powder | 2 | 2 | 2 | 2 |
| Cocoa powder | 2 | 2 | 2 | 2 |
| Salt | 0.02 | 0.02 | 0.02 | 0.02 |
| Water | 89.95 | 88.96 | 84.67 | 84.67 |
| Results of Evaluation | | | | |
| Calories (kcal/100 g) | 19.1 | 21.1 | 23.7 | 19.7 |
| Aftertaste | good | good | good | good |

EXAMPLES 8 TO 11

TABLE 8

Composition of Compounded Cocoa composition (wt %)

| Ingredient | 8 | 9 | 10 | 11 |
|---|---|---|---|---|
| Erythritol | 33.16 | 24.90 | 55.84 | 46.17 |
| Maltitol | 33.16 | 24.90 | 23.04 | 19.05 |
| Stevia | 0.28 | 0.22 | — | — |
| Aspartame | — | — | 0.04 | 0.03 |
| Skimmed milk powder | 22.11 | 16.60 | 13.96 | 11.54 |
| Cocoa powder | 11.05 | 33.20 | 6.98 | 23.09 |
| Salt | 0.22 | 0.17 | 0.14 | 0.12 |

TABLE 9

Composition of Aqueous Solution (wt %) and Results of Evaluation

| Ingredient | 8 | 9 | 10 | 11 |
|---|---|---|---|---|
| Erythritol | 3 | 3 | 8 | 8 |
| Maltitol | 3 | 3 | 3.3 | 3.3 |
| Stevia | 0.026 | 0.026 | — | — |
| Aspartame | — | — | 0.006 | 0.006 |
| Skimmed milk powder | 2 | 2 | 2 | 2 |
| Cocoa powder | 1 | 4 | 1 | 4 |
| Salt | 0.02 | 0.02 | 0.02 | 0.02 |
| Water | 90.95 | 87.95 | 85.67 | 82.67 |
| Results of Evaluation | | | | |
| Calories (kcal/100 g) | 16.2 | 25.0 | 16.8 | 25.6 |
| Aftertaste | good | good | good | good |

It can be seen from the above results that the compounded cocoa composition prepared in Examples was superior in calories and aftertaste to the comparative one using only sucrose as a sweetener.

While the invention has been described in detail and with reference to specific examples thereof, it will be apparent to one skilled in the art that various changes and modifications can be made therein without departing from the spirit and scope thereof.

What is claimed is:

1. A low-calorie compounded cocoa composition comprising cocoa powder, erythritol, and a sweetener of high sweetness, wherein said erythritol is crystals having passed through a sieve having an opening of 149 μm, wherein said erythritol is present in dispersibility or solubility improving effective amounts.

2. The low-calorie compounded cocoa composition according to claim 1, which comprises 6 to 34% by weight of cocoa powder, 24 to 75% by weight of erythritol, and 0.03 to 0.28% by weight of a sweetener of high sweetness.

3. The low-calorie compounded cocoa composition according to claim 1, wherein said erythritol is crystals having a particle size of 74 μm or smaller.

4. The low-calorie compounded cocoa composition according to claim 1, wherein said sweetener of high sweetness is selected from the group consisting of Stevia and Aspartame.

5. The low-calorie compounded cocoa composition according to claim 1, which further comprises 19 to 37% by weight of maltitol.

6. The low-calorie compounded cocoa composition according to claim 1, obtained by dry blending and mixing said cocoa powder, said erythritol, and said sweetener of high sweetness, each in powder form.

* * * * *